United States Patent
Tanaka et al.

(10) Patent No.: US 10,150,696 B2
(45) Date of Patent: Dec. 11, 2018

(54) METHOD FOR PRODUCING GLASS SHEET

(71) Applicant: Nippon Sheet Glass Company, Limited, Tokyo (JP)

(72) Inventors: Satoshi Tanaka, Hyogo (JP); Keiko Tsuri, Osaka (JP); Hirotaka Koyo, Hyogo (JP); Kazuishi Mitani, Osaka (JP); Yasuhiro Saito, Osaka (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 5 days.

(21) Appl. No.: 15/025,820

(22) PCT Filed: Sep. 26, 2014

(86) PCT No.: PCT/JP2014/004942
§ 371 (c)(1),
(2) Date: Mar. 29, 2016

(87) PCT Pub. No.: WO2015/045405
PCT Pub. Date: Apr. 2, 2015

(65) Prior Publication Data
US 2016/0244357 A1    Aug. 25, 2016

(30) Foreign Application Priority Data
Sep. 30, 2013  (JP) ................................ 2013-203850

(51) Int. Cl.
*C03C 15/00*    (2006.01)
*C03C 3/087*    (2006.01)

(52) U.S. Cl.
CPC .............. *C03C 15/00* (2013.01); *C03C 3/087* (2013.01)

(58) Field of Classification Search
CPC ......... C03C 15/00; C03C 15/02; C03C 21/00; C03B 27/00; C03B 27/04; C03B 27/026
See application file for complete search history.

(56) References Cited

U.S. PATENT DOCUMENTS 6,008,128 A * 12/1999 Habuka ............ H01L 21/02046
257/E21.226
2004/0237589 A1   12/2004 Sato
(Continued)

FOREIGN PATENT DOCUMENTS

EP    2202208 A1   6/2010
EP    2 754 645     7/2014
(Continued)

OTHER PUBLICATIONS

Extended European Search Report issued for corresponding European Patent Application No. 14847924.9, dated Mar. 31, 2017, 5 pages.

*Primary Examiner* — Joseph S Del Sole
*Assistant Examiner* — Mohamed K Ahmed Ali
(74) *Attorney, Agent, or Firm* — Hamre, Schumann, Mueller & Larson, P.C.

(57) ABSTRACT

The glass sheet production method of the present invention includes the steps of: (I) bringing a first acid gas into contact with at least one principal surface of a sheet-shaped glass material, the first acid gas containing hydrogen fluoride (HF) gas but not containing hydrogen chloride (HCl) gas and having a volume ratio of water vapor to HF gas of less than 8, the glass material containing at least sodium as a component and having a temperature in a range from a glass transition temperature to a temperature 250° C. higher than the glass transition temperature; (II) before or after the step (I), bringing a second acid gas into contact with the principal surface of the sheet-shaped glass material, the second acid gas containing HCl gas and optionally containing HF gas, wherein when the second acid gas contains both HCl gas and HF gas, the second acid gas further contains water vapor with a volume ratio of water vapor to HF gas of 8 or more; and (III) cooling the sheet-shaped glass material having (Continued)

undergone both the step (I) and the step (II) so as to obtain a glass sheet.

5 Claims, 4 Drawing Sheets

(56) References Cited

U.S. PATENT DOCUMENTS

| | | |
|---|---|---|
| 2014/0246084 A1 | 9/2014 | Okahata |
| 2015/0291467 A1 | 10/2015 | Miura et al. |
| 2016/0046519 A1 | 2/2016 | Tanka et al. |

FOREIGN PATENT DOCUMENTS

| | | | |
|---|---|---|---|
| JP | 2005067974 A | * | 3/2005 |
| JP | 2012-148950 | | 8/2012 |
| JP | 2014080332 A | * | 5/2014 |
| WO | 2012/141310 | | 10/2012 |
| WO | 2012/141311 | | 10/2012 |
| WO | 2013/035746 | | 3/2013 |
| WO | 2014/104303 | | 7/2014 |
| WO | 2014/167842 | | 10/2014 |
| WO | 2014/175362 | | 10/2014 |

* cited by examiner

METHOD FOR PRODUCING GLASS SHEET

TECHNICAL FIELD

The present invention relates to a method for producing a surface-modified glass sheet.

BACKGROUND ART

Conventionally, glass sheets are subjected to various surface treatments to obtain high transmittance glass sheets. As a method for obtaining a high transmittance glass sheet, formation of a low reflection film on the surface of a glass sheet so as to prevent a loss of light transmittance due to surface reflection and thus to increase the light transmittance has been proposed (see Patent Literature 1).

Patent Literature 2 has proposed formation of fine irregularities serving as a low refractive index layer on the surface of a glass sheet in addition to formation of a low reflection film (i.e., an anti-reflection film) thereon. Such a structure enhances the anti-reflection effect of the low reflection film. These fine irregularities can be formed by surface treatment of the glass sheet with a fluorinating agent (such as HF gas).

CITATION LIST

Patent Literature

Patent Literature 1: JP 2012-148950 A
Patent Literature 2: WO 2013/035746 A1

SUMMARY OF INVENTION

Technical Problem

Production of a glass sheet coated with a thin film as proposed in Patent Literature 1 and Patent Literature 2 inevitably requires an additional step of forming the film on the glass sheet, which leads to an increase in cost, although some improvement in the transmittance can be expected. The peel resistance and durability of the thin film thus formed are also matters of concern.

In addition, the inventors' intensive studies reveal that irregularities formed in the surface of a glass sheet by surface treatment with HF gas, as disclosed in Patent Literature 2, cannot maintain their own shape when the glass sheet is subjected to heat treatment at a thermal tempering temperature (about 650° C.) for common soda-lime glass. This means that the properties such as a high transmittance provided by the irregularities can be significantly degraded by heat treatment.

It is therefore an object of the present invention to provide, without a significant increase in cost, a high transmittance glass sheet having improved heat resistance enough to withstand heat treatment applied to the glass sheet having been subjected to surface treatment for improving the transmittance without a significant decrease in the transmittance.

Solution to Problem

The present invention provides a method for producing a surface-modified glass sheet, including the steps of;

(I) bringing a first acid gas into contact with at least one principal surface of a sheet-shaped glass material, the first acid gas containing hydrogen fluoride (HF) gas but not containing hydrogen chloride (HCl) gas and having a volume ratio of water vapor to HF gas (volume of water vapor/volume of HF gas) of less than 8, the glass material containing at least sodium as a component and having a temperature in a range from a glass transition temperature to a temperature 250° C. higher than the glass transition temperature;

(II) before or after the step (I), bringing a second acid gas into contact with the principal surface of the sheet-shaped glass material, the second acid gas containing HCl gas and optionally containing HF gas, wherein when the second acid gas contains both HCl gas and HF gas, the second acid gas further contains water vapor with a volume ratio of water vapor to HF gas (volume of water vapor/volume of HF gas) of 8 or more; and (III) cooling the sheet-shaped glass material having undergone both the step (I) and the step (II) so as to obtain a glass sheet.

Advantageous Effects of Invention

According to the production method of the present invention, in the step (I), at least one principal surface of a sheet-shaped glass material can be subjected to a treatment for obtaining a surface morphology that allows an increase in the transmittance, and in the step (II), the glass material can be subjected to a treatment for enhancing the heat resistance of the surface morphology that allows an increase in the transmittance. Therefore, according to the production method of the present invention, a high transmittance glass sheet having improved heat resistance can be produced in a simple way without a significant increase in cost.

DESCRIPTION OF EMBODIMENTS

Figure 1:
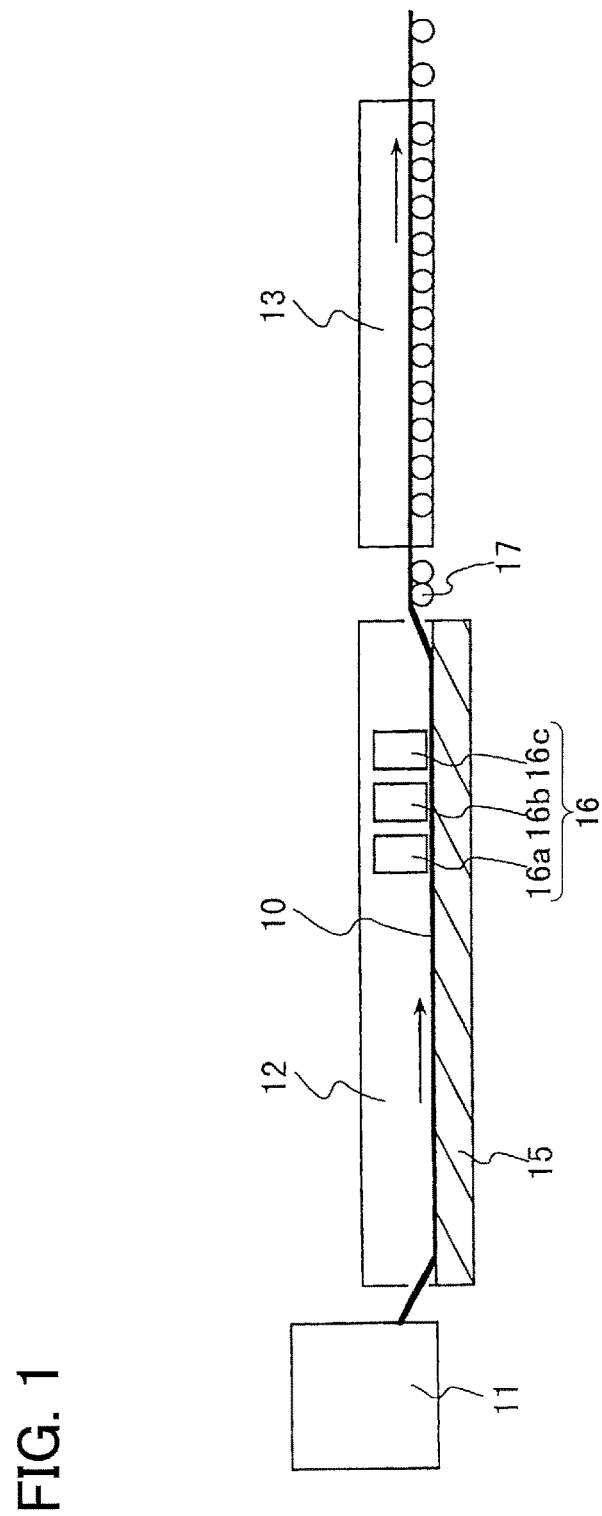
FIG. 1 is a schematic diagram showing an example of a system capable of carrying out a glass sheet production method of the present invention.

Hereinafter, an embodiment of the present invention will be described in detail.

The glass sheet production method of the present embodiment is a method for producing a surface-modified glass sheet, including the steps of;

(I) bringing a first acid gas into contact with at least one principal surface of a sheet-shaped glass material, the first acid gas containing HF gas but not containing HCl gas and having a volume ratio of water vapor to HF gas (volume of water vapor/volume of HF gas) of less than 8, the glass material containing at least sodium as a component and having a temperature in a range from a glass transition temperature to a temperature 250° C. higher than the glass transition temperature (Tg to Tg+250° C.);

(II) before or after the step (I), bringing a second acid gas into contact with the principal surface of the sheet-shaped glass material, the second acid gas containing HCl gas and optionally containing HF gas, wherein when the second acid gas contains both HCl gas and HF gas, the second acid gas further contains water vapor with a volume ratio of water vapor to HF gas (volume of water vapor/volume of HF gas) of 8 or more; and (III) cooling the sheet-shaped glass material having undergone both the step (I) and the step (II) so as to obtain a glass sheet.

First, the step (I) is described. The step (I) is a step for forming, in the surface of a sheet-shaped glass material, a surface morphology that allows an increase in the transmittance. By bringing a first acid gas into contact with at least one principal surface of a sheet-shaped glass material having a temperature in a range of Tg to Tg+250° C., irregularities with a depth of about 100 to 400 nm can be formed in the surface of the glass material having been exposed to the first acid gas. The irregularities with this depth increase the transmittance of 380 to 1100-nm wavelength light. The phrase "irregularities with a depth of about 100 to 400 nm" means that the distance in the thickness direction of the glass material between the maximum peak (i.e., the highest peak of the irregularities in the thickness direction of the principal surface of the glass material) and the maximum valley (i.e., the deepest valley of the irregularities in the thickness direction of the principal surface of the glass material) is in the range of about 100 to 400 nm. The same applies when the depth of the irregularities is mentioned in the following description.

The glass sheet having irregularities with a depth of about 100 to 400 nm in its surface can exhibit a high transmittance. The average value of transmittance gains for 380 to 1100-nm wavelength light can be increased to 0.5 or more or even 1.0 or more in the glass sheet obtained by the production method of the present embodiment. Here, the transmittance gains for 380 to 1100-nm wavelength light described in the present description are each a value obtained by subtracting a measured value of the transmittance of the glass material before the step (I) from a measured value of the transmittance of the glass material after the step (I). In general, the transmittance gain is calculated for every 1-nm wavelength interval. The average value of transmittance gains is a value obtained by determining the values of transmittance gains at the corresponding wavelengths in the wavelength range (the wavelength range of 380 to 1100 nm in the present embodiment) for which the average value is to be calculated, and then by performing simple averaging of the determined values.

The first acid gas contains HF as an acid. The concentration of HF contained in the first acid gas is preferably 2 to 6 vol %, and more preferably 3 to 5 vol %. An acid that is converted into HF in the course of a reaction, that is, an acid from which HF is produced as a result of the reaction, also can be used as the acid contained in the first acid gas. If the concentration of HF in the first acid gas is too high, the depth of the irregularities formed in the surface of the glass material may be too large beyond the above-mentioned range and thus the haze ratio may increase. As a result, sufficient transmittance gains may not be obtained due to light scattering. On the other hand, if the concentration of HF in the first acid gas is too low, the depth of the irregularities formed in the surface of the glass material may fall below the above-mentioned range. As a result, sufficient transmittance gains may not be obtained.

The present inventors believe that the reason why the contact of the surface of the high-temperature (Tg to Tg+250° C.) glass material with the first acid gas can change the surface morphology of the glass material as described above is as follows. The reason is described herein with reference to an example of the first acid gas containing HF gas and water vapor. When the first acid gas is brought into contact with the surface of the high-temperature glass material, HF gas in the first acid gas breaks Si—O bonds that are basic structures of the glass. As a result, the water vapor in the first acid gas and the moisture in the atmosphere in various forms, such as in the form of proton (H$^+$), water (H$_2$O), and oxonium ion (H$_3$O$^+$), easily enter the glass. In addition, phenomena such as corrosion of glass by HF gas and reprecipitation of glass occur in a complicated manner. Probably, because of these factors, the above-mentioned irregularities that allow an increase in the transmittance are formed in the surface of the glass material.

The first acid gas contains HF gas but does not contain HCl gas. If the step (I) is performed on the high-temperature glass material using, for example, an acid gas containing both HF and HCl, larger irregularities are formed and the haze ratio is increased. This mechanism is described more specifically. When HF comes into contact with the surface of the glass material, HF breaks Si—O bonds that are basic structures of the glass (Reaction Formula (1) below) or causes a dealkalization reaction to occur (Reaction Formulae (2) and (3)).

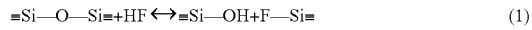  (1)

  (2)

  (3)

Furthermore, when HCl comes into contact with the surface of the glass material, HCl reacts with sodium contained in the glass, so that NaCl crystals are formed locally (Reaction Formula (4) below).

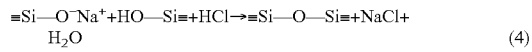  (4)

In a region where NaCl is present, the rate of glass etching reaction by HF (Reaction Formula (5) below) is lower than that in a region where NaCl is not present. That is, the rate of glass etching reaction by HF varies from place to place in the surface of the glass material. Since the glass material is at a high temperature, the rate of the formation of NaCl crystals and the rate of the etching reaction are both high. Therefore, random irregularities with large height differences ranging from about 0.1 to 3 μm are formed in the surface of the glass material.

  (5)

The first acid gas may or may not contain water vapor. When the first acid gas contains water vapor, the volume ratio of water vapor to HF gas needs to be less than 8. This is because when the volume of water vapor is at 8 or more times that of HF gas, a flat layer without irregularities is formed on the surface of the glass material, resulting in a decrease in the transmittance gains and thus poor practicality. When the glass comes into contact with the first acid gas, water vapor enters the glass in various forms, such as in the form of proton (H$^+$), water (H$_2$O), and oxonium ion (H$_3$O$^+$), after which the water vapor having entered the glass exits from the glass by dehydration condensation. When the amount of the water vapor is 8 or more times that of the HF gas, dehydration condensation proceeds dominantly over corrosion of the glass by HF gas, which reduces formation of irregularities. The volume ratio of water vapor to HF gas is preferably 2 or less to obtain higher transmittance gains.

Next, the step (II) is described. The step (II) is a step for enhancing the heat resistance of the surface morphology (i.e., irregularities) formed in the step (I) to increase the transmittance of the glass material. By bringing a second acid gas into contact with at least one principal surface of a sheet-shaped glass material having a temperature in a range of 600 to 750° C., the heat resistance of the irregularities mentioned above can be enhanced by the action of HCl gas contained in the second acid gas.

The action of HCl gas in the second acid gas is described. Presumably, the irregularities formed in the surface of the glass material in the step (I) have a weak glass network having many silanol groups (≡Si—OH). As the dehydration condensation of a region having these irregularities is promoted by the action of the HCl gas used in the step (II), which is performed independently of the step (I), formation of a rigid $SiO_2$ network proceeds. As a result, the heat resistance of the irregularities is enhanced. This mechanism is described more specifically. When HF is bought into contact with the surface of the glass material at a high temperature of Tg to Tg+250° C., a mode in which the $SiO_2$ glass network is etched and a mode in which $Na^+$ ions in the glass are replaced by $H^+$ (or $H_3O^+$) ions by ion exchange proceed. Silanol groups (≡Si—OH) produced by the contact between the surface of the glass material and HF undergo dehydration condensation to form a ≡Si—O—Si≡ network in the surface of the glass material. However, all the silanol groups in the surface are not dehydrated and condensed. Therefore, the surface of the glass material having been subjected only to the step (I) has a glass structure having many silanol groups, in other words, a water-rich glass network. HCl gas is considered to have a catalytic effect on dehydration condensation reaction. Therefore, exposure of the surface of the glass material to HCl gas promotes dehydration condensation efficiently and rapidly, and thus the heat resistance of the irregularities is enhanced.

The step (II) may be performed before or after the step (I). For example, even if the step (II) is performed first to bring HCl gas in the second acid gas into contact with the surface of the glass material and then the step (I) is performed, the effect of the HCl gas in the second acid gas exerted on the glass material in the step (II) probably remains even after the irregularities are formed in the surface of the glass material in the step (I). Therefore, also in this case, the heat resistance of the irregularities formed in the step (I) can be enhanced by the step (II). It should be noted, however, that in the case where the step (II) is performed before the step (I), dehydration condensation begins before the irregularities are formed, and thus the irregularities may be less likely to be formed than their formation in the case where the step (II) is performed after the step (I). Therefore, it is preferable to perform the step (II) after the step (I) to obtain higher transmittance gains.

The second acid gas contains HCl as an acid. The concentration of HCl contained in the second acid gas is preferably 3 to 30 vol %. The concentration of HCl contained in the second acid gas is more preferably 8 vol % or less. In order to impart higher heat resistance to the irregularities, the concentration of HCl contained in the second acid gas is more preferably 4 vol % or more. With the HCl concentration of 4 vol % or more, the glass sheet can maintain its high transmittance even after heat treatment. An acid that is converted into HCl in the course of a reaction, that is, an acid from which HCl is produced as a result of the reaction, may be used as the acid contained in the second acid gas.

The second acid gas may or may not contain water vapor. The second acid gas may or may not further contain HF gas. The concentration of the HF gas contained in the second acid gas is preferably 0 to 10 vol %, and more preferably 0 to 5 vol %. An acid that is converted into HF in the course of a reaction, that is, an acid from which HF is produced as a result of the reaction, also can be used as the acid contained in the second acid gas. However, when the second acid gas contains both HCl gas and HF gas, the second acid gas needs to contain water vapor with a volume ratio of water vapor to HF gas (volume of water vapor/volume of HF gas) of 8 or more. If the second acid gas containing HF gas is brought into contact with the glass material, peculiar irregularities are formed and thus the haze ratio increases. As a result, the transmittance gains are reduced due to light scattering. However, when the second acid gas further contains water vapor at a concentration at least 8 times that of HF gas, the formation of such peculiar irregularities by the HF gas is suppressed. As a result, an increase in the haze ratio is suppressed and high transmittance gains can be maintained. In addition, even if the second acid gas used in the step (II) contains HF gas and water vapor at a concentration at least 8 times that of the HF gas, a flat layer with no irregularities is not formed in the surface of the glass material because the step (I) is performed independently of the step (II).

The contact with the first acid gas in the step (I) and the contact with the second acid gas in the step (II) are performed on the glass material having a temperature in a range of Tg to Tg+250° C. If the temperature of the glass material is too high, the depth of the irregularities formed in the surface of the glass material is too large and thus the haze ratio increases. As a result, the transmittance gains are reduced due to light scattering. If the temperature of the glass material is too low, the size of the irregularities formed in the surface of the glass material decreases. As a result, sufficient transmittance gains cannot be obtained. It is preferable to bring the first acid gas and the second acid gas into contact with the glass material having a temperature in a range of Tg+50° C. to Tg+200° C.

The contact with the first acid gas in the step (I) and the contact with the second acid gas in the step (II) may each be performed at least two separate times. For example, the contact with the first acid gas, the contact with the first acid gas, and the contact with the second acid gas may be performed in this order.

The time of contact with the first acid gas and the time of contact with the second acid gas are not particularly limited. For example, they are each preferably 2 to 8 seconds, and more preferably 3 to 6 seconds. If the time of contact is too long, the depth of the irregularities formed in the surface of the glass material is too large and thus the haze ratio increases. As a result, sufficient transmittance gains may not be obtained due to light scattering. On the other hand, if the time of contact is too short, the depth of the irregularities formed in the surface of the glass material is too small. As a result, sufficient transmittance gains may not be obtained. In bringing the gas into contact with the surface of the glass material at least two separate times, it is recommended to carry out the treatment so that the total time of the treatment falls within the above time range.

In the step (III), the glass material having undergone the step (I) and the step (II) is cooled to obtain a glass sheet. The cooling method is not particularly limited, and the cooling method performed in any known glass sheet production method can be used.

The glass sheet production method of the present embodiment can be applied, for example, to the production of a glass sheet by a float process. That is, the glass sheet production method of the present embodiment may be a production method in which:

the sheet-shaped glass material used in the step (I) and the step (II) is obtained by forming a molten glass material into a sheet on a molten metal, in the step (I), the first acid gas is brought into contact with the principal surface of the sheet-shaped glass material on the molten metal, and in the step (II), the second acid gas is brought into contact with the principal surface of the sheet-shaped glass material on the molten metal.

This method can be carried out, for example, using a system shown in FIG. 1. An example where the glass sheet production method of the present embodiment is applied to the production of a glass sheet by a float process is described below.

A glass material melted (molten glass) in a float furnace 11 flows from the float furnace 11 into a float bath 12, forms into a semisolid glass ribbon (a sheet-shaped glass material) 10 while traveling on molten tin (molten metal) 15, and is then drawn out of the float bath by a roller 17 to be fed into an annealing furnace 13. The glass ribbon solidified in the annealing furnace 13 is cut into glass sheets having a predetermined size by a cutting device which is not shown.

A predetermined number of spray guns 16 (three spray guns 16a, 16b, and 16c in the system shown) are disposed in the float bath 12 at a predetermined distance from the surface of the high-temperature glass ribbon 10 on the molten tin 15. The first acid gas is continuously supplied onto the glass ribbon 10 from at least one of the spray guns 16a to 16c. The second acid gas is continuously supplied onto the glass ribbon 10 from at least one of the spray guns 16a to 16c except for the spray gun for supplying the first acid gas. The temperature of the glass ribbon 10 on the molten tin 15 is set within a range of Tg to Tg+250° C. It is preferable to set the temperature of the glass ribbon 10 on the molten tin 15 within a range of Tg+50° C. to Tg+200° C.

In the system shown in FIG. 1, the step (III) of cooling the sheet-shaped glass material is carried out in the annealing furnace 13.

As the glass material, any known glass material can be used as long as it has a glass composition that can be used in the float process. For example, common soda-lime glass, aluminosilicate glass, or the like can be used, and its composition is not particularly limited as long as it contains sodium as a component. For example, common clear glass or low iron glass can be used. The thickness of the sheet-shaped glass material to be formed is not particularly limited because it is determined as appropriate depending on the thickness of a glass sheet to be produced. The thickness of the finally obtained glass sheet is not particularly limited, and can be 0.3 to 25 mm, for example.

According to the production method of the present embodiment, it is possible to produce a high transmittance glass sheet having improved heat resistance only by performing a very simple operation of bringing specific first and second gases into contact with the surface of a sheet-shaped glass material. In addition, it is also possible to perform the production method of the present embodiment using a production line for the float process, which is a continuous glass sheet production method. Thus, according to the production method of the present invention, it is possible to provide a high transmittance glass sheet having improved heat resistance in a more simple way than in conventional methods, without a significant decrease in production efficiency but with a minimal increase in production cost.

EXAMPLES

Hereinafter, the present invention will be described in more detail using examples. However, the present invention is not limited to the examples given below, and other examples are possible as long as they do not depart from the gist of the present invention.

Method for Producing Glass Sheet

Examples 1 to 11

Figure 2:
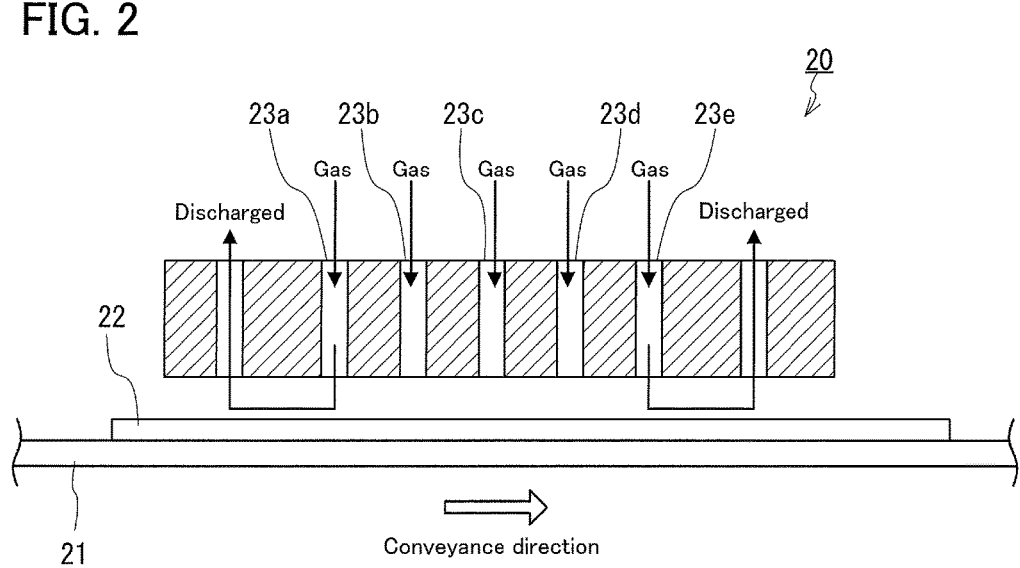
FIG. 2 is a schematic diagram showing an apparatus used in Examples and Comparative Examples.

Glass sheets having a thickness of 3 mm and 4 mm were produced respectively by a float process. First, a glass material was prepared so as to have the following main composition of glass: 70.8% of $SiO_2$, 1.0% of $Al_2O_3$, 8.5% of CaO, 5.9% of MgO, and 13.2% of $Na_2O$, where "%" means "mass %". The glass material was melted, the molten glass material was formed into a glass ribbon on molten tin in a float bath. The Tg of this glass material was 558° C. In these Examples, the first acid gas and the second acid gas were respectively blown onto one principal surface of each 3-mm-thick or 4-mm-thick glass sheet (i.e., a sheet-shaped glass material) obtained by cutting the glass ribbon, using a production line different from the glass sheet production line. That is, in these Examples, the blowing of the gases was performed off-line. An apparatus 20 as shown in FIG. 2, including a conveyer mechanism 21 for conveying glass sheets and five spray guns 23a to 23e for blowing the gases onto the surface of a conveyed glass sheet 22, was used for blowing of the gases. The apparatus 20 was also equipped with a heating mechanism (not shown) for heating the conveyed glass sheet 22. In these Examples, the first spray gun 23a and the fifth spray gun 23e, among the spray guns 23a to 23e, were used to blown the first acid gas and the second acid gas. The second to fourth spray guns 23b to 23d were used to blow $N_2$ gas. The first acid gas and the second acid gas heated at 180° C. were respectively brought into contact with the glass sheet 22 heated at a predetermined temperature (in a range of Tg to Tg+250° C.) for a predetermined time. Table 1 shows the thickness of the glass sheet, the treatment conditions (including the components of the first acid gas and those of the second acid gas), the temperature of the glass sheet in contact with the gasses, and the time of contact with the gases in each Example. $N_2$ gas was used to dilute the first acid gas and the second acid gas. That is, the remainder of the first and second acid gases except for the components shown in Table 1 was only $N_2$ gas. 99.99% of HCl gas was used as the HCl gas. The HF gas was obtained by evaporating a 55 mass % aqueous HF solution.

Comparative Examples 1 to 10

The gases were blown onto the glass sheets produced in the same manner as in Examples 1 to 11 using the same apparatus 20. In Comparative Examples 1, 2, and 5 to 9, only one of the first acid gas and the second acid gas was blown onto the glass sheets. This means that in Comparative Examples 1, 2, and 5 to 9, only the first spray gun 23a among the five spray guns 23a to 23e of the apparatus 20 was used to blow the first acid gas or the second acid gas. The second to fifth spray guns 23b to 23e were used to blow the $N_2$ gas. In Comparative Examples 3, 4, and 10, the first acid gas and the second acid gas were blown in the same manner as in Examples 1 to 11. Table 1 shows the thickness of the glass sheet, the treatment conditions (including the components of the first acid gas and those of the second acid gas), the temperature of the glass sheet in contact with the gasses, and the time of contact with the gases in each Comparative Example. $N_2$ gas was used to dilute the first acid gas and the second acid gas. That is, the remainder of the first and second acid gases except for the components shown in Table 1 was only $N_2$ gas. 99.99% of HCl gas was used as the HCl gas. The HF gas was obtained by evaporating a 55 mass % aqueous HF solution.

[Evaluation Method]

The glass sheets of Examples 1 to 11 and Comparative Examples 1 to 10 were subjected to heat treatment, and the transmittance gains before the heat treatment and the transmittance gains after the heat treatment were determined. The method of subjecting the glass sheets to the heat treatment and the method of determining the transmittance gains are as follows.

(Heat Treatment)

10 samples of 50 mm×50 mm obtained by cutting a glass sheet were placed in an electric furnace set at an ambient temperature of 760° C. The surface temperature of the glass sheets rose from room temperature toward 760° C. immediately after they were placed in the furnace. After the elapse of a period of time required to heat the samples to about 650° C., which was the temperature estimated for thermal tempering, the samples were taken out of the electric furnace and annealed at room temperature. The surface temperatures of the glass sheets were measured. The highest surface temperature of the 3-mm-thick glass sheet was 649° C. after the elapse of 220 seconds, while that of the 4-mm-thick glass sheet was 656° C. after the elapse of 240 seconds.

(Average Value of Transmittance Gains)

For the glass sheets of Examples 1 to 11 and Comparative Examples 1 to 10, the average value of transmittance gains for 380 to 1100-nm wavelength light was determined. First, in order to determine transmittance gains, the transmittance of the glass sheet before blowing of the first acid gas and the second acid gas (before contact with the gases), the transmittance of the glass sheet after blowing of the first acid gas and the second acid gas (after contact with the gases), and the transmittance of the glass sheet after the heat treatment were each measured in the wavelength range of 380 to 1100 nm for every 1-nm wavelength interval using a spectrophotometer, U4100 manufactured by Hitachi High-Technologies Corporation. For each measurement wavelength, a transmittance gain before the heat treatment was calculated by subtracting the transmittance of the glass sheet before contact with the gases from the transmittance of the glass sheet after contact with the gases. This was followed by simple averaging of the transmittance gains in the wavelength range of 380 to 1100 nm to determine the average value of the transmittance gains before the heat treatment. For each measurement wavelength, a transmittance gain after the heat treatment was calculated by subtracting the transmittance of the glass sheet before contact with the gases from the transmittance of the glass sheet after the heat treatment. This was followed by simple averaging of the transmittance gains in the wavelength range of 380 to 1100 nm to determine the average value of the transmittance gains after the heat treatment.

TABLE 1

| | Thickness of glass sheet (mm) | Treatment conditions | Time of contact with gases | Temperature of glass sheet (° C.) | Before heat treatment | Average value of transmittance gains (wavelengths: 380 to 1100 nm) After heat treatment (thickness: 4 mm) | After heat treatment (thickness: 3 mm) |
|---|---|---|---|---|---|---|---|
| Example 1 | 4 | 4% HF•3.6% $H_2O$→4% HCl | 3.4 s→3.4 s | 630° C. | 2.8 | 1.9 | |
| Example 2 | 4 | 4% HF•3.6% $H_2O$→8% HCl | 3.4 s→3.4 s | 630° C. | 2.1 | 2.0 | |
| Example 3 | 4 | 4% HF•3.6% $H_2O$→1% HCl | 3.4 s→3.4 s | 630° C. | 1.9 | 0.3 | |
| Example 4 | 4 | 4% HF•3.6% $H_2O$→4% HCl | 3.4 s→3.4 s | 600° C. | 2.0 | 1.8 | |
| Example 5 | 3 | 4% HF•3.6% $H_2O$→4% HCl | 3.4 s→3.4 s | 650° C. | 2.7 | | 2.2 |
| Example 6 | 3 | 4% HF•3.6% $H_2O$→4% HCl•60% $H_2O$ | 3.4 s→3.4 s | 650° C. | 2.2 | | 2.2 |
| Example 7 | 3 | 4% HF•3.6% $H_2O$→4% HF•4% HCl•60% $H_2O$ | 3.4 s→3.4 s | 650° C. | 2.7 | | 1.5 |
| Example 8 | 3 | 4% HF•3.6% $H_2O$→4% HCl | 5.6 s→5.6 s | 650° C. | 2.3 | | 2.0 |
| Example 9 | 3 | 4% HCl→4% HF•3.6% $H_2O$ | 5.6 s→5.6 s | 650° C. | 2.5 | | 1.5 |
| Example 10 | 3 | 4% HCl•60% $H_2O$→4% HF•3.6% $H_2O$ | 3.4 s→3.4 s | 650° C. | 1.7 | | 0.3 |
| Example 11 | 3 | 4% HF•4% HCl•60% $H_2O$→4% HF•3.6% $H_2O$ | 3.4 s→3.4 s | 650° C. | 1.1 | | 0.3 |
| Com. Example 1 | 3 | 4% HF•3.6% $H_2O$ | 5.6 s | 650° C. | 2.2 | | −0.1 |
| Com. Example 2 | 4 | 4% HF•3.6% $H_2O$ | 3.4 s | 630° C. | 3.1 | −0.3 | |
| Com. Example 3 | 4 | 4% HF•3.6% $H_2O$→4% HF•3.6% $H_2O$ | 3.4 s→3.4 s | 630° C. | 2.0 | 0.0 | |
| Com. Example 4 | 4 | 4% HF•3.6% $H_2O$→4% HF•60% $H_2O$ | 3.4 s→3.4 s | 630° C. | 3.2 | −0.3 | |
| Com. Example 5 | 4 | 4% HF•60% $H_2O$ | 3.4 s | 630° C. | 0.5 | −0.3 | |
| Com. Example 6 | 3 | 4% HCl | 3.4 s | 650° C. | 0.1 | | −0.3 |
| Com. Example 7 | 3 | 4% HCl•60% $H_2O$ | 3.4 s | 650° C. | 0.2 | | −0.3 |
| Com. Example 8 | 3 | 4% HF•4% HCl•3.6% $H_2O$ | 3.4 s | 630° C. | 0.6 | | 0.0 |
| Com. Example 9 | 3 | 4% HF•4% HCl•60% $H_2O$ | 3.4 s | 650° C. | 0.3 | | 0.0 |
| Com. Example 10 | 3 | 4% HF•3.6% $H_2O$→4% HF•4% HCl•3.6% $H_2O$ | 3.4 s→3.4 s | 650° C. | 0.6 | | 0.0 |

The glass sheets produced by the production methods of Examples 1 to 11 that met all the requirements of the production method of the present invention exhibited high transmittance gains even after the heat treatment. This means that the glass sheets produced by the production methods of Examples 1 to 11 were glass sheets having both high heat resistance and high transmittances. The transmittance gains of the glass sheets of Examples 3, 10, and 11 after the heat treatment were all 0.3, which was lower than the transmittance gains of the glass sheets of other Examples. The reasons for this are probably as follows. In Example 3, the HCl concentration in the second acid gas was relatively low and thus the effect obtained by the step (II) was also relatively low. In Examples 10 and 11, the transmittance gains obtained by the step (I) were low due to haze and thus the transmittance gains after the heat treatment were reduced.

On the other hand, for the glass sheets produced by the production methods of Comparative Examples 1 to 10 that did not meet the requirements of the production method of the present invention, their transmittance gains were relatively low even before the heat treatment, and thus their transmittance gains after the heat treatment were 0 or less. This means that the heat resistance of the glass sheets produced by the production methods of Comparative Examples 1 to 10 was too low to maintain high transmittances after the heat treatment. The transmittance gains of the glass sheets of Comparative Examples 1 to 5, 8, and 10 were 0.5 or more, which were relatively high before the heat treatment, but after the heat treatment, the transmittance gains were reduced to 0 or less. Presumably, this is because the step (II) was not performed or the second acid gas used did not meet the requirements and thus the heat resistance could not be obtained.

Figure 3A:
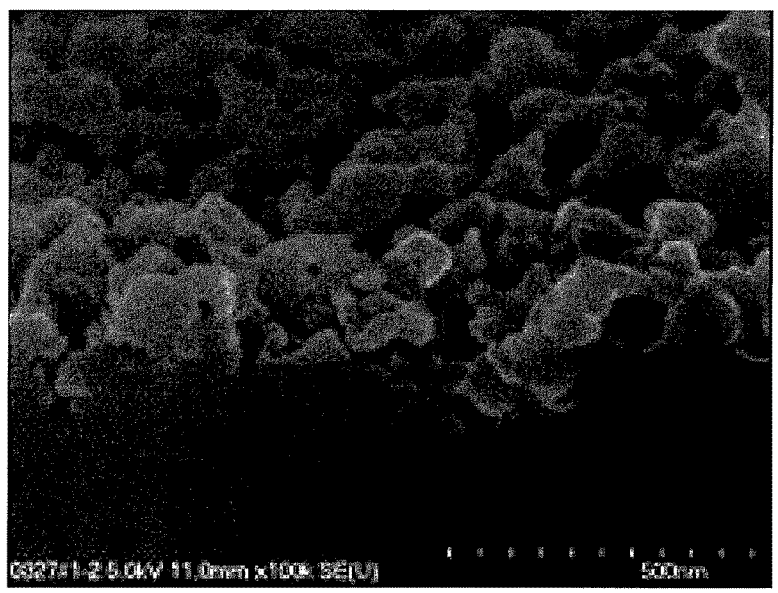
FIG. 3A is a SEM photograph of a glass sheet of Example 8, taken from obliquely above, before heat treatment.
Figure 3B:
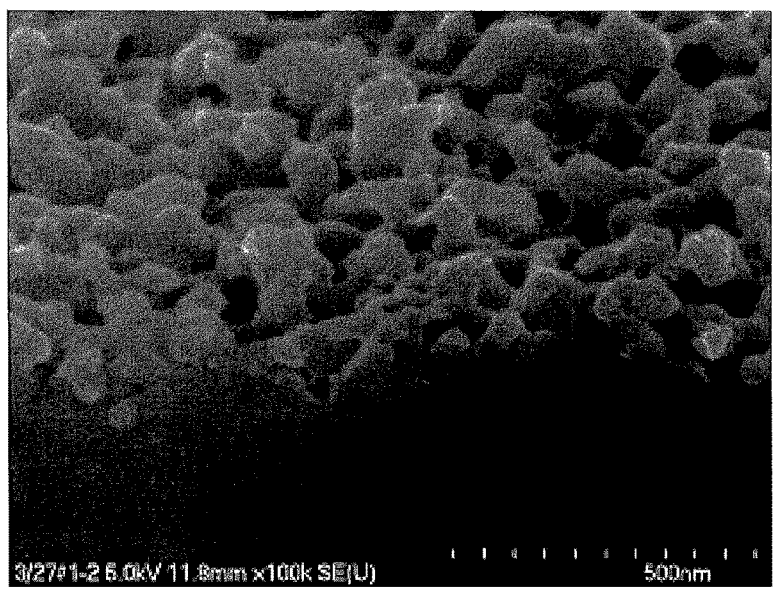
FIG. 3B is a SEM photograph of the glass sheet of Example 8, taken from obliquely above, after the heat treatment.
Figure 4A:
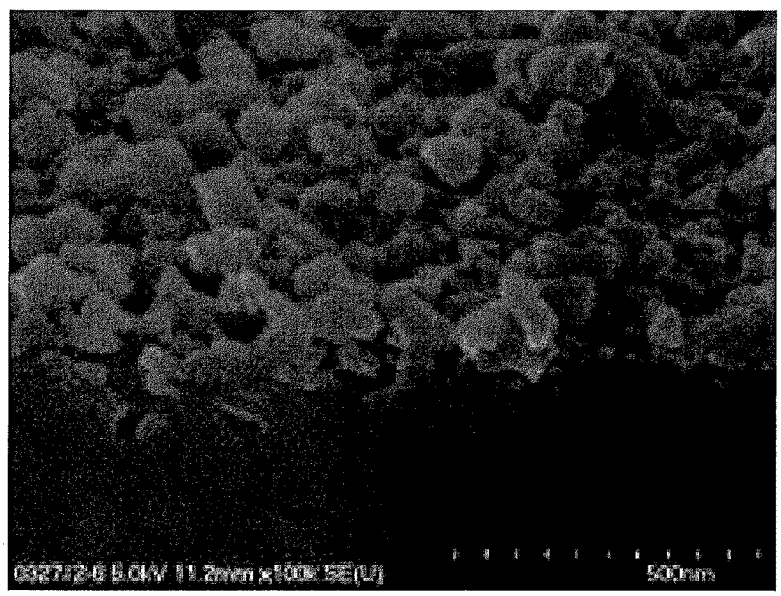
FIG. 4A is a SEM photograph of a glass sheet of Comparative Example 1, taken from obliquely above, before heat treatment.
Figure 4B:
FIG. 4B is a SEM photograph of the glass sheet of Comparative Example 1, taken from obliquely above, after the heat treatment.

For the glass sheets of Example 8 and Comparative Example 1, SEM photographs thereof were taken from obliquely above before and after heat treatment (i.e., SEM photographs including the irregular surfaces and cross sections of the glass sheets). FIG. 3A is a SEM photograph of the glass sheet of Example 8, taken from obliquely above before the heat treatment, and FIG. 3B is a SEM photograph of the glass sheet of Example 8, taken from obliquely above after the heat treatment. FIG. 4A is a SEM photograph of the glass sheet of Comparative Example 1, taken from obliquely above before the heat treatment, and FIG. 4B is a SEM photograph of the glass sheet of Comparative Example 1, taken from obliquely above after the heat treatment. In the glass sheet of Example 8, the irregular surface morphology was maintained even after the heat treatment. In contrast, in the glass sheet of Comparative Example 1, the irregularities were removed by the heat treatment.

INDUSTRIAL APPLICABILITY

According to the production method of the present invention, a high light transmittance glass sheet having improved heat resistance can be produced. Therefore, glass sheets produced by the production method of the present invention are suitable for use as cover glass plates for solar cells which are required to make highly efficient use of sunlight, low-E glass products having improved transmittances, and even glass displays. In addition, since the glass sheet of the present invention has a reduced reflectance, it is also expected to be used in applications such as anti-reflection (or anti-glare) windshields, store windows, and displays.

The invention claimed is:
1. A method for producing a surface-modified glass sheet, comprising the steps of:
(I) bringing a first acid gas into contact with at least one principal surface of a sheet-shaped glass material, the first acid gas containing hydrogen fluoride (HF) gas but not containing hydrogen chloride (HCl) gas and having a volume ratio of water vapor to HF gas (volume of water vapor/volume of HF gas) of less than 8, the glass material containing at least sodium as a component and having a temperature in a range from a glass transition temperature to a temperature 250° C. higher than the glass transition temperature;
(II) bringing a second acid gas into contact with the principal surface of the sheet-shaped glass material, the second acid gas containing HCl gas and optionally containing HF gas, wherein when the second acid gas contains both HCl gas and HF gas, the second acid gas further contains water vapor with a volume ratio of water vapor to HF gas (volume of water vapor/volume of HF gas) of 8 or more; and
(III) cooling the sheet-shaped glass material having undergone both the step (I) and the step (II) so as to obtain a glass sheet,
wherein the step (I) produces a surface morphology that provides an increase in transmittance of the glass sheet,
the step (II) enhances heat resistance of the surface morphology, and
the step (II) is carried out for a given portion of the sheet-shaped glass material before or after the step (I) is carried out for the given portion of the sheet-shaped glass material, and not at the same time the step (I) is carried out for the given portion of the sheet-shaped glass material.
2. The method for producing a glass sheet according to claim 1, wherein in the step (I), the first acid gas is brought into contact with the principal surface of the sheet-shaped glass material so as to modify a surface morphology of the principal surface of the sheet-shaped glass material so that an average value of transmittance gains of the glass material for 380 to 1100-nm wavelength light is 0.5 or more.
3. The method for producing a glass sheet according to claim 1, wherein the second acid gas contains 4 vol % or more of HCl gas.
4. The method for producing a glass sheet according to claim 1, wherein the step (II) is performed after the step (I).
5. The method for producing a glass sheet according to claim 1, wherein
the sheet-shaped glass material used in the step (I) and the step (II) is obtained by forming a molten glass material into a sheet on a molten metal,
in the step (I), the first acid gas is brought into contact with the principal surface of the sheet-shaped glass material on the molten metal, and
in the step (II), the second acid gas is brought into contact with the principal surface of the sheet-shaped glass material on the molten metal.

\* \* \* \* \*